Jan. 2, 1934.  A. J. FAUSEK ET AL  1,941,467
TORCH
Filed Feb. 20, 1929
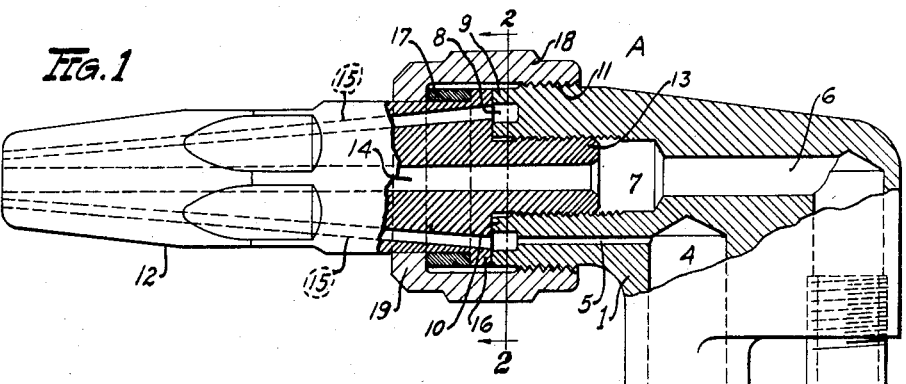
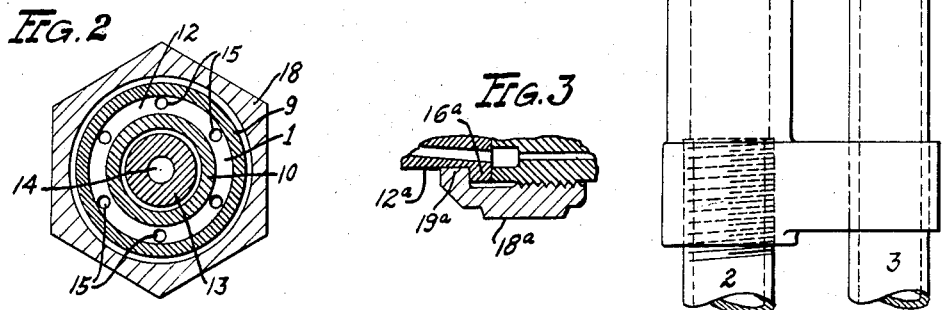
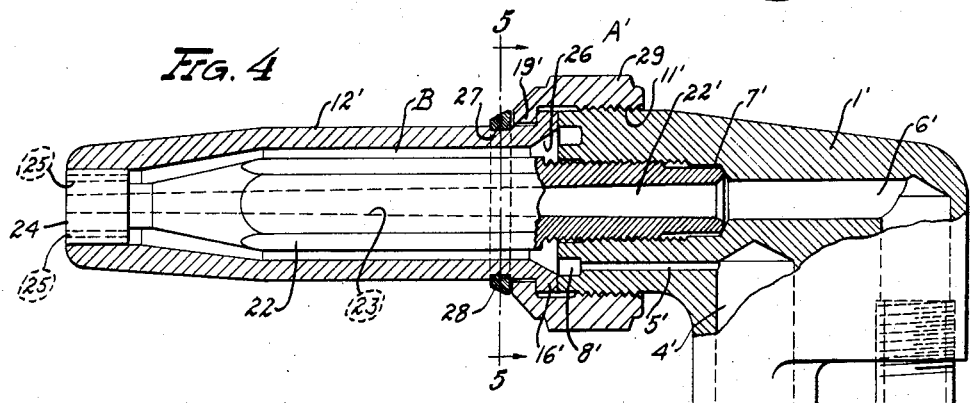
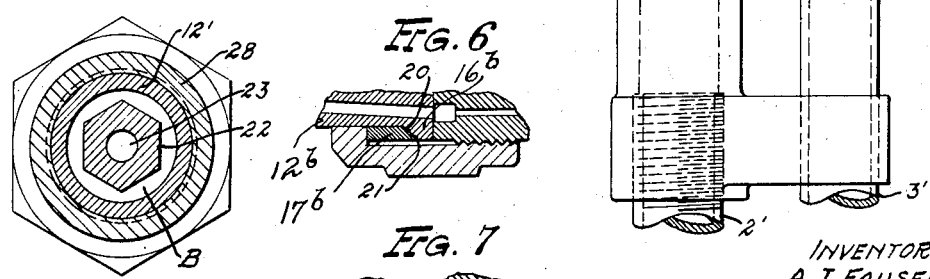
INVENTORS
A. J. FAUSEK
I. F. FAUSEK
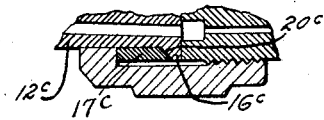
ATTORNEY Patented Jan. 2, 1934

1,941,467

UNITED STATES PATENT OFFICE 1,941,467

TORCH

Arthur J. Fausek and Irwing F. Fausek,
St. Louis, Mo.

Application February 20, 1929. Serial No. 341,311

9 Claims. (Cl. 158—27.4)

This invention relates generally to torches or blow pipes adapted for use in metal cutting operations and more specifically to an improved apparatus of this type which is so constructed and arranged that very close and fluid-tight contact is obtained between the cooperating faces of the tip and head of the torch.

Many cutting torches are provided with heads having portions with which the tips thereof contact which portions include each a pair of concentric rings. The tips contact with the concentric rings referred to and even though the torch heads are constructed with the greatest care, it frequently happens that one or the other of said concentric rings is of greater height than the associated ring. The result of this situation, prior to this invention, has been that when the tip was drawn into contact with the concentric rings of the head the higher ring would contact with the tip while the associated ring was spaced apart therefrom, and this higher ring would in most cases absolutely prevent seating of the tip against the lower ring.

One of the main objects of the present invention is to overcome the disadvantages referred to above, and this object is accomplished by so constructing the tip that the portion thereof which contacts with the concentric rings of the head is possessed of sufficient resiliency to permit said portion to contact firmly with said concentric ring even though there be slight irregularities in the shape and height thereof.

Another important object of the invention is to provide a cutting torch of the type having a tip within which a hollow interior member is positioned, with improved means for connecting the tip to the head of the torch. It has been found in the use of torches of this type, that it is frequently difficult to remove the tip without at the same time removing the hollow member positioned therein. This difficulty results from the fact that the tip and inner hollow member are frequently caused to adhere to each other by deposits of material left at the discharge end of the tip by the cutting operations and, therefore, if the tip is rotated in removing same from the head, the hollow member therein will likewise be rotated.

By constructing the cutting torch as disclosed in the present application, the tip may be removed from the head of the torch without subjecting same to rotary movement, hence said tip may be removed independent of the hollow member positioned therein.

Figure 1 is an enlarged fragmentary view partly in elevation and partly in section showing our improved torch.

Figure 2 is a cross section on line 2—2 of Figure 1.

Figure 3 is a fragmentary section illustrating a modified form of the invention.

Figure 4 is a fragmentary view partly in elevation and partly in section showing the torch with a different tip applied thereto.

Figure 5 is a cross section on line 5—5 of Figure 4.

Figure 6 is a fragmentary view showing a modified form of the invention.

Figure 7 illustrates still another modified form of the invention.

Referring now to Figures 1 and 2 of the drawing wherein is illustrated one embodiment merely of the invention A designates our improved torch which comprises a head portion 1 to which gas conductors 2 and 3 lead in the manner common to torches of this type. The head 1 is provided with a gas passageway 4 which is in communication with the gas conductor 2, and this gas passageway 4 communicates also with a gas passageway 5 of reduced diameter. The head 1 of the torch is provided also with a gas passageway 6 which communicates with the conductor 3, this latter passageway terminating in an opening 7 of enlarged diameter which is located at the outer end of the head 1. The enlarged opening 7 is internally screw-threaded as shown clearly in Figure 1. The head 1 of the torch is provided with an annular recess 8 at the forward end thereof, the presence of which results in the formation of a pair of spaced concentric rings 9 and 10. The gas passageway 5 already referred to herein communicates with the annular recess 8 as shown in Figure 1, and the outer surface of the head 1 has screw-threads 11 formed thereon.

12 designates the tip of our improved torch which comprises a body portion having the shape common to tips of the type employed with cutting torches, said body portion at its inner end having an externally screw-threaded stem 13 extended therefrom. The tip 12 is provided with a central passageway 14 formed therethrough from end to end thereof, and said tip is provided also with a plurality of gas passageways 15 which are disposed in a circle about the central passageway 14. At the point where the stem 13 joins the main body portion of the tip 12, said tip is provided with an outwardly projected annular flange 16.

17 designates a ring which encircles the tip at a point immediately adjacent to the annular flange 16, said ring being of such diameter that the inner face thereof is in close contact with the outer face of the tip and one end face of said ring contacts with an adjacent face of the flange 16 as shown in Figure 1.

18 designates a nut which is screwed on the screw-threads 11 formed on the outer surface of the head 1, said nut being arranged to encircle a portion of the head of the torch and a portion of the tip 12. The nut 18 has an inwardly extended flange portion 19 which embraces the tip of the torch and the inner face of said flange 19 contacts with the end face of the ring 17 remote from the face thereof which contacts with the annular flange 16.

In attaching a tip to the head of a torch constructed as shown in Figures 1 and 2, the nut is passed over the outer end of the tip and said nut is passed longitudinally of said tip. The stem 13 of the tip is screwed into the opening 7 until the inner end face of the body portion of the tip is in close contact with the rings 9 and 10. The internal screw-threads within the nut 18 are caused to engage the threads 11 on the head 1 of the torch, and said nut is screwed longitudinally of said head until the inner face of the annular flange 19 of the nut contacts with the ring 17 and after such contact has been made continued rotation of the nut 18 in a direction to move same rearwardly on the head will force the tip into very close contact with the concentric rings 9 and 10.

A feature of the invention which is of paramount importance resides in the fact that the metal at the point where the flange 16 joins the main body portion of the tip is quite thin, especially adjacent to the passageways 15. Figure 1 of the drawing is drawn to a scale which is approximately twice full size, hence the thin character of the metal at the point referred to is not as obvious as it would be if the scale on which the view is drawn were full size merely. However, if it is remembered that Figure 1 shows a torch drawn on a greatly enlarged scale, it will be plain that the metal of the tip adjacent to the annular flange is quite thin and this, as stated above, is particularly true of the material located adjacent to the passageways 15.

With the foregoing in mind, it is quite obvious that when the stem 13 is screwed into the opening 7 to cause the flange 16 to contact with the concentric rings 9 and 10, and when the nut 18 has drawn said flange into close contact with said concentric rings, the flexible nature of said flange will permit said flange to adapt itself to any irregularities in the shape or height of the concentric rings whereby very close and fluid tight contact will be obtained between the flange 16 and the concentric rings.

In Figure 3 we illustrate a form of the invention where the ring 17 shown in Figure 1 is omitted. In this form of the invention, the flange 19$^a$ of the nut 18$^a$ contacts directly with the annular flange 16$^a$ of the tip 12$^a$.

In the form of the invention illustrated in Figure 6, a ring 17$^b$ is employed and this ring is provided with an inclined face 20 and a shoulder 21 which contact with correspondingly shaped faces on the annular flange 16$^b$ of the tip 12$^b$.

The form of the invention shown in Figure 7 very closely resembles that shown in Figure 6, the only difference being that the ring 17$^c$ in Figure 7 is not provided with the shoulder 21 shown in Figure 6. The ring 17$^c$ of Figure 7, however, is provided with an inclined face 20$^c$ which contacts with a correspondingly shaped face on the flange 16$^c$ of the tip 12$^c$.

It will be noted that in each of the forms of the invention shown in Figures 1, 3, 6 and 7 the coacting screwthreads of the head and nut are positioned inwardly of the head with respect to the concentric rings 9 and 10, hence, the pull exerted on the annular flange of the tip is in a direction longitudinally of the concentric rings, and because the screwthreads are located beyond the concentric rings there is no tendency for the outer ring to be distorted by manipulation of the nut as may be the case if the screw-threads were formed on said outer ring.

In Figures 4 and 5 the torch A' comprises a head 1' in which the usual gas passageways 4', 5' and 6' are formed. As in Figure 1 gas conductors 2' and 3' lead to the passageways 4' and 6' and said passageway 6' terminates in an enlarged screw-threaded opening 7'. The tip of the torch illustrated in Figure 4 comprises an outer casing 12' and an inner member 22, and said inner member 22 is provided with a central passageway 23 which extends longitudinally therethrough from end to end thereof. At its outer end, the inner member 22 is provided with a head portion 24 which is of such diameter that it fits closely within the bore of the outer casing 12' and this head portion 24 is provided with a plurality of passageways 25 formed therethrough. At the end of the inner member 22 opposite to the end thereof at which the head portion 24 is arranged, said member is provided with a screw-threaded stem 22', which is adapted to be screwed into the screw-threaded opening 7' to secure said member 22 to the head of the torch in a manner to cause the central passageway thereof to be in communication with the passageway 6'.

At the inner end thereof, the outer casing 12' of the tip of the torch is provided with an annular flange 16' and at this end thereof the outer casing has an inclined annular face 26 whereby the space B between the outer face of the inner member and the inner face of the outer casing, and the annular recess 8' of the head are caused to communicate with each other.

Formed in the outer casing 12' of the tip of the torch shown in Figure 4, in spaced relation with respect to the annular flange 16' is a recess 27 and seated in this recess is a ring 28. 29 designates a nut which resembles the nut 18 shown in Figure 1, said nut 29 having an internally screw-threaded portion, the threads of which are adapted to engage screw-threads 11' formed on the head 1' of the torch. The nut 29 is likewise provided with an inwardly projected flange 19' which, as shown clearly in Figure 4 is extended between the flange 16' of the outer casing 12' and the ring 28, whereby said nut is movably attached to the outer casing 12'.

In attaching the tip to the torch illustrated in Figures 4 and 5, the nut 29 will be arranged so that the internal screw-threads thereof will engage the screw-threads 11' on the torch head 1' and movement of the nut 29 inwardly of the torch head in response to rotary movement of said nut will draw the inner end face of the outer casing 12' into close contact with the adjacent end of the torch head, whereby a fluid-tight joint will be provided at that point. It will be noted that while the nut 29 is attached to the outer casing 12 by having its inwardly extended flange 19' confined between the ring 28 and the flange 16', still this connection is so loose that the nut may be freely rotated without subjecting the outer casing to rotary movement. As a result of this arrangement, the outer casing 12' may be removed from the head of the torch by rotating only the nut and because the outer casing is not rotated during the removal thereof from the torch head, there is no tendency to rotate the inner member 22 as has been the case prior to this invention when deposits resulting from the cutting operations caused the outer casing and the head portion 24 of the inner member 22 to adhere to each other.

We claim:

1. A torch having a head, and a tip attached to said head with a portion thereof in contact with a portion of said head, said portion of the tip adapted to contact with a portion of the head of the torch being connected to the body of the tip by a section of such reduced thickness as to render said tip portion flexible to permit same to adapt itself to irregularities in the cooperating portion of the head.

2. A torch having a head, and a tip attached to said head, said tip being provided with a flange portion adapted to contact with a portion of said head, said flange portion being connected to the body of the tip by a section of such reduced thickness as to render said flange portion flexible to permit same to adapt itself to irregularities in the cooperating portion of the head.

3. A torch having a head, and a tip attached to said head, said tip being provided with a flange portion joined to the body portion of the tip by a body of material which is of such reduced thickness as to render said flange portion flexible with respect to said body portion, said flange portion being adapted to contact with a portion of said head in a manner to cause same to adapt itself to irregularities in the cooperating portion of the head.

4. A torch having a head, and a tip attached to said head, said tip being provided with a flange portion joined to the body portion of the tip by a body of material which is of such reduced thickness as to render said flange portion flexible with respect to said body portion, said tip having passageways formed therethrough at the point where said flange portion joins said body portion, whereby the flexibility of said flange is increased, said flange portion being adapted to contact with a portion of said head in a manner to cause same to adapt itself to irregularities in the cooperating portion of the head.

5. A torch having a head, a tip attached to said head, said tip being provided with a flange portion joined to the body portion of the tip by a body of material which is of such reduced thickness as to render said flange portion flexible with respect to said body portion, said tip having passageways formed therethrough at the point where said flange portion joins said body portion whereby the flexibility of said flange is increased, said flange portion being adapted to contact with a portion of said head in a manner to cause same to adapt itself to irregularities in the cooperating portion of the head, and means for securing said tip to said head.

6. A torch having a head, a tip attached to said head, said tip being provided with a flange portion joined to the body portion of the tip by a body of material which is of such reduced thickness as to render said flange portion flexible with respect to said body portion, said tip having passageways formed therethrough at the point where said flange portion joins said body portion whereby the flexibility of said flange is increased, said flange portion being adapted to contact with a portion of said head in a manner to cause some to adapt itself to irregularities in the cooperating portion of the head, and a nut for securing said tip to said head.

7. A torch having a head, a tip attached to said head, said tip being provided with a flange portion joined to the body portion of the tip by a relatively thin body of material, whereby said flange is flexible with respect to said body portion, a ring surrounding said tip at a point adjacent to said flange portion, said flange portion being adapted to contact with a portion of said head in a manner to cause same to adapt itself to irregularities in the cooperating portion of the head, and a nut engaging said ring and adapted to attach said tip to said head.

8. A torch having a head, a tip attached to said head, said tip being provided with a flange portion joined to the body portion of the tip by a relatively thin body of material, whereby said flange is flexible with respect to said body portion, a ring surrounding said tip at a point adjacent to said flange portion, said flange portion being adapted to contact with a portion of said head provided with concentric flange portions in a manner to cause same to adapt itself to irregularities in the cooperating portion of the head, and a nut engaging said ring and adapted to attach said tip to said head.

9. A torch having a head, a tip attached to said head, said tip being provided with a flange portion joined to the body portion of the tip by a relatively thin body of material, whereby said flange is flexible with respect to said body portion, said flange portion being adapted to contact with a portion of said head having concentric flanges in a manner to cause same to adapt itself to irregularities in the cooperating portion of the head, and a nut having screw-threads adapted to cooperate with screw-threads formed on the head, said screw-threads on the head being located beyond the outer portions of the concentric flanges of the head.

ARTHUR J. FAUSEK.
IRWING F. FAUSEK.